(12) United States Patent
Bysick et al.

(10) Patent No.: US 9,764,873 B2
(45) Date of Patent: Sep. 19, 2017

(54) REPOSITIONABLE BASE STRUCTURE FOR A CONTAINER

(71) Applicant: GRAHAM PACKAGING COMPANY, L.P., York, PA (US)

(72) Inventors: Scott E. Bysick, Elizabethtown, PA (US); Gregory A. Trude, Seven Valley, PA (US)

(73) Assignee: Graham Packaging Company, L.P., York, PA (US)

(*) Notice: Subject to any disclaimer, the term of this patent is extended or adjusted under 35 U.S.C. 154(b) by 673 days.

(21) Appl. No.: 14/255,622

(22) Filed: Apr. 17, 2014

(65) Prior Publication Data

US 2014/0224813 A1    Aug. 14, 2014

Related U.S. Application Data

(62) Division of application No. 12/964,127, filed on Dec. 9, 2010, now Pat. No. 8,726,616, which is a division of application No. 11/249,342, filed on Oct. 14, 2005, now Pat. No. 7,900,425.

(51) Int. Cl.
| | | |
|---|---|---|
| *B65D 79/00* | (2006.01) | |
| *B65D 1/02* | (2006.01) | |
| *B29C 49/54* | (2006.01) | |
| *B67C 3/22* | (2006.01) | |

(52) U.S. Cl.
CPC .......... *B65D 1/0284* (2013.01); *B29C 49/541* (2013.01); *B65D 1/0276* (2013.01); *B65D 79/005* (2013.01); *B67C 2003/226* (2013.01)

(58) Field of Classification Search
CPC ..... B65D 79/00; B65D 79/005; B65D 1/0276

USPC ................. 220/609, 624; 215/373, 381
See application file for complete search history.

(56) References Cited

U.S. PATENT DOCUMENTS

| | | |
|---|---|---|
| 1,499,239 A | 6/1924 | Malmquist |
| 2,142,257 A | 1/1937 | Saeta |
| D110,624 S | 7/1938 | Mekeel et al. |
| 2,124,959 A | 7/1938 | Vogel |
| 2,378,324 A | 6/1945 | Ray et al. |
| 2,880,902 A | 4/1959 | Owsen |
| 2,960,248 A | 11/1960 | Kuhlman |
| 2,971,671 A | 2/1961 | Shakman |

(Continued)

FOREIGN PATENT DOCUMENTS

| | | |
|---|---|---|
| AU | 2002257159 | 4/2003 |
| CA | 2 077 717 | 3/1993 |

(Continued)

OTHER PUBLICATIONS

ISR and Written Opinion from PCT/US2010/020045, dated Mar. 15, 2010.

(Continued)

*Primary Examiner* — Sue A Weaver
(74) *Attorney, Agent, or Firm* — Baker Botts L.L.P.

(57) ABSTRACT

Systems and methods for vacuum compensation in hot-filled and cooled containers. Each container reduces, via one or more vacuum panels, a first portion of a vacuum created in the container. Each container also has a repositionable portion to reduce a second portion of the vacuum. During hot-filling, no portion of the repositionable portion extends below a standing or bearing surface of the container.

18 Claims, 7 Drawing Sheets

(56) References Cited

U.S. PATENT DOCUMENTS

| | | |
|---|---|---|
| 2,982,440 A | 5/1961 | Harrison |
| 3,043,461 A | 7/1962 | Glassco |
| 3,081,002 A | 3/1963 | Tauschinski et al. |
| 3,090,478 A | 5/1963 | Stanley |
| 3,142,371 A | 7/1964 | Rice et al. |
| 3,142,409 A * | 7/1964 | Ross ............... B65D 43/022 220/281 |
| 3,174,655 A | 3/1965 | Hurschman |
| 3,198,861 A | 8/1965 | Marvel |
| 3,201,111 A | 8/1965 | Afton |
| 3,301,293 A | 1/1967 | Santelli |
| 3,325,031 A | 6/1967 | Singier |
| 3,397,724 A | 8/1968 | Bolen et al. |
| 3,409,167 A | 11/1968 | Blanchard |
| 3,417,893 A | 12/1968 | Lieberman |
| 3,426,939 A | 2/1969 | Young |
| 3,441,982 A | 5/1969 | Hiroshi et al. |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,819,789 A | 6/1974 | Parker |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor |
| 3,942,673 A | 3/1976 | Lyu et al. |
| 3,949,033 A | 4/1976 | Uhlig |
| 3,956,441 A | 5/1976 | Uhlig |
| 4,036,926 A | 7/1977 | Chang |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,158,624 A | 6/1979 | Ford et al. |
| 4,170,622 A | 10/1979 | Uhlig et al. |
| 4,174,782 A | 11/1979 | Obsomer |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla et al. |
| 4,381,061 A | 4/1983 | Cerny et al. |
| D269,158 S | 5/1983 | Gaunt |
| 4,386,701 A | 6/1983 | Galer |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,497,621 A | 2/1985 | Kudert et al. |
| 4,497,855 A | 2/1985 | Agrawal et al. |
| 4,525,401 A | 6/1985 | Pocock et al. |
| 4,542,029 A | 9/1985 | Caner et al. |
| 4,547,333 A | 10/1985 | Takada |
| 4,577,775 A * | 3/1986 | Kresin ............... B65D 1/265 220/604 |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,701,121 A | 10/1987 | Jakobsen et al. |
| 4,723,661 A | 2/1988 | Hoppmann et al. |
| 4,724,855 A | 2/1988 | Jackson et al. |
| 4,747,507 A | 5/1988 | Fitzgerald et al. |
| 4,749,092 A | 6/1988 | Sugiura et al. |
| 4,769,206 A | 9/1988 | Reymann et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Cassidy et al. |
| 4,836,398 A | 6/1989 | Leftault et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,962,863 A | 10/1990 | Wendling et al. |
| 4,967,538 A | 11/1990 | Leftault et al. |
| 4,978,015 A | 12/1990 | Walker |
| 4,997,692 A | 3/1991 | Yoshino |
| 5,004,109 A | 4/1991 | Bartley et al. |
| 5,005,716 A | 4/1991 | Eberle |
| 5,014,868 A | 5/1991 | Wittig et al. |
| 5,024,340 A | 6/1991 | Alberghini et al. |
| 5,033,254 A | 7/1991 | Zenger |
| 5,060,453 A | 10/1991 | Alberghini et al. |
| 5,067,622 A | 11/1991 | Garver et al. |
| 5,090,180 A | 2/1992 | Sorensen |
| 5,092,474 A | 3/1992 | Leigner |
| 5,122,327 A | 6/1992 | Spina et al. |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,310,043 A | 5/1994 | Alcorn |
| 5,333,761 A | 8/1994 | Davis et al. |
| 5,337,909 A | 8/1994 | Vailliencourt |
| 5,337,924 A | 8/1994 | Dickie |
| 5,341,946 A | 8/1994 | Vailliencourt et al. |
| 5,389,332 A | 2/1995 | Amari et al. |
| 5,392,937 A | 2/1995 | Prevot et al. |
| 5,407,086 A | 4/1995 | Ota et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers et al. |
| 5,484,052 A | 1/1996 | Pawloski et al. |
| 5,492,245 A | 2/1996 | Kalkanis |
| 5,503,283 A | 4/1996 | Semersky |
| 5,543,107 A | 8/1996 | Malik et al. |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,672,730 A | 9/1997 | Cottman |
| 5,687,874 A | 11/1997 | Omori et al. |
| 5,690,244 A | 11/1997 | Darr |
| 5,704,504 A | 1/1998 | Bueno |
| 5,713,480 A | 2/1998 | Petre et al. |
| 5,730,914 A | 3/1998 | Ruppmann, Sr. |
| 5,735,420 A | 4/1998 | Nakamaki et al. |
| 5,737,827 A | 4/1998 | Kuse et al. |
| 5,758,802 A | 6/1998 | Wallays |
| 5,762,221 A | 6/1998 | Tobias et al. |

(56) References Cited

U.S. PATENT DOCUMENTS

| | | |
|---|---|---|
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,860,556 A | 1/1999 | Robbins et al. |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D415,030 S | 10/1999 | Searle |
| 5,971,184 A | 10/1999 | Krishnakumar et al. |
| 5,976,653 A | 11/1999 | Collette et al. |
| RE36,639 E | 4/2000 | Okhai |
| 6,045,001 A | 4/2000 | Seul |
| 6,065,624 A | 5/2000 | Steinke |
| 6,068,110 A | 5/2000 | Kumakiri et al. |
| 6,074,596 A | 6/2000 | Jacquet |
| 6,077,554 A | 6/2000 | Wiemann et al. |
| 6,090,334 A | 7/2000 | Matsuno et al. |
| 6,105,815 A | 8/2000 | Mazda |
| 6,176,382 B1 | 1/2001 | Bazlur Rashid |
| 6,213,325 B1 | 4/2001 | Cheng et al. |
| 6,217,818 B1 | 4/2001 | Collette et al. |
| 6,228,317 B1 | 5/2001 | Smith et al. |
| 6,230,912 B1 | 5/2001 | Rashid |
| 6,277,321 B1 | 8/2001 | Vailliencourt et al. |
| 6,298,638 B1 | 10/2001 | Bettle |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |
| 6,467,639 B2 | 10/2002 | Mooney |
| 6,485,669 B1 | 11/2002 | Boyd et al. |
| 6,502,369 B1 | 1/2003 | Andison et al. |
| 6,514,451 B1 | 2/2003 | Boyd et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,635,217 B1 | 10/2003 | Britton |
| 6,662,960 B2 | 12/2003 | Hong et al. |
| 6,749,075 B2 | 6/2004 | Bourque et al. |
| 6,749,780 B2 | 6/2004 | Tobias |
| 6,763,968 B1 | 7/2004 | Boyd et al. |
| 6,769,561 B2 | 8/2004 | Futral et al. |
| 6,779,673 B2 | 8/2004 | Melrose et al. |
| 6,923,334 B2 | 8/2005 | Melrose et al. |
| 6,942,116 B2 | 9/2005 | Lisch et al. |
| 6,983,858 B2 | 1/2006 | Slat et al. |
| 7,051,073 B1 | 5/2006 | Dutta |
| 7,051,889 B2 | 5/2006 | Boukobza |
| D522,368 S | 6/2006 | Darr et al. |
| 7,073,675 B2 | 7/2006 | Trude |
| 7,077,279 B2 | 7/2006 | Melrose |
| 7,137,520 B1 | 11/2006 | Melrose |
| 7,140,505 B2 | 11/2006 | Roubal et al. |
| 7,150,372 B2 | 12/2006 | Lisch et al. |
| 7,159,374 B2 | 1/2007 | Abercrombie et al. |
| D538,168 S | 3/2007 | Davis et al. |
| D547,664 S | 7/2007 | Davis et al. |
| 7,350,657 B2 | 4/2008 | Eaton et al. |
| D572,599 S | 7/2008 | Melrose |
| 7,416,089 B2 | 8/2008 | Kraft et al. |
| D576,041 S | 9/2008 | Melrose et al. |
| 7,451,886 B2 | 11/2008 | Lisch et al. |
| 7,543,713 B2 | 6/2009 | Trude et al. |
| 7,574,846 B2 | 8/2009 | Sheets et al. |
| 7,674,891 B2 | 3/2010 | Gravina et al. |
| 7,726,106 B2 | 6/2010 | Kelley et al. |
| 7,735,304 B2 | 6/2010 | Kelley et al. |
| 7,799,264 B2 | 9/2010 | Trude |
| 7,900,425 B2 | 3/2011 | Bysick et al. |
| D641,244 S | 7/2011 | Bysick et al. |
| 8,017,065 B2 | 9/2011 | Trude et al. |
| 8,726,616 B2 | 5/2014 | Bysick et al. |
| 2001/0035391 A1 | 11/2001 | Young et al. |
| 2002/0074336 A1 | 6/2002 | Silvers |
| 2002/0096486 A1 | 7/2002 | Bourque |
| 2002/0153343 A1 | 10/2002 | Tobias |
| 2002/0158038 A1 | 10/2002 | Heisel et al. |
| 2003/0015491 A1 | 1/2003 | Melrose et al. |
| 2003/0186006 A1 | 10/2003 | Schmidt et al. |
| 2003/0196926 A1 | 10/2003 | Tobias et al. |
| 2003/0205550 A1 | 11/2003 | Prevot et al. |
| 2003/0217947 A1 | 11/2003 | Ishikawa et al. |
| 2004/0000533 A1 | 1/2004 | Kamineni et al. |
| 2004/0016716 A1 | 1/2004 | Melrose et al. |
| 2004/0074864 A1 | 4/2004 | Melrose et al. |
| 2004/0129669 A1 | 7/2004 | Kelley et al. |
| 2004/0149677 A1 | 8/2004 | Slat et al. |
| 2004/0173565 A1 | 9/2004 | Semersky et al. |
| 2004/0211746 A1 | 10/2004 | Trude |
| 2004/0232103 A1 | 11/2004 | Lisch et al. |
| 2005/0211662 A1 | 9/2005 | Eaton et al. |
| 2005/0218108 A1 | 10/2005 | Bangi et al. |
| 2006/0006133 A1 | 1/2006 | Lisch et al. |
| 2006/0138074 A1 | 6/2006 | Melrose |
| 2006/0151425 A1 | 7/2006 | Kelley et al. |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |
| 2007/0017892 A1 | 1/2007 | Melrose |
| 2007/0045222 A1 | 3/2007 | Denner et al. |
| 2007/0045312 A1 | 3/2007 | Abercrombie et al. |
| 2007/0051073 A1 | 3/2007 | Kelley et al. |
| 2007/0084821 A1 | 4/2007 | Bysick et al. |
| 2007/0125742 A1 | 6/2007 | Simpson et al. |
| 2007/0125743 A1 | 6/2007 | Pritchett et al. |
| 2007/0131644 A1 | 6/2007 | Melrose |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |
| 2008/0156847 A1 | 7/2008 | Hawk et al. |
| 2008/0257856 A1 | 10/2008 | Melrose et al. |
| 2009/0202766 A1 | 8/2009 | Beuerle et al. |
| 2009/0293436 A1 | 12/2009 | Miyazaki et al. |
| 2010/0116778 A1 | 5/2010 | Melrose |
| 2010/0163513 A1 | 7/2010 | Pedmo |
| 2010/0170199 A1 | 7/2010 | Kelley et al. |
| 2010/0213204 A1 | 8/2010 | Melrose |
| 2010/0237083 A1 | 9/2010 | Trude et al. |
| 2011/0049083 A1 | 3/2011 | Scott et al. |
| 2011/0094618 A1 | 4/2011 | Melrose |

FOREIGN PATENT DOCUMENTS

| | | |
|---|---|---|
| DE | 1761753 | 1/1972 |
| DE | 2102319 | 8/1972 |
| DE | 3215866 | 11/1983 |
| EP | 0 225 155 | 6/1987 |
| EP | 0 346 518 | 12/1989 |
| EP | 0 502 391 | 9/1992 |
| EP | 0 521 642 | 1/1993 |
| EP | 0 551 788 | 7/1993 |
| EP | 0 666 222 | 2/1994 |
| EP | 0 739 703 | 10/1996 |
| EP | 0 609 348 | 2/1997 |
| EP | 0 916 406 | 5/1999 |
| EP | 0 957 030 | 11/1999 |
| EP | 1 063 076 | 12/2000 |
| EP | 0 505 054 | 2/2001 |
| FR | 1 571 499 | 6/1969 |
| FR | 2 607 109 | 5/1988 |
| GB | 781 103 | 8/1957 |
| GB | 1 113 988 | 5/1968 |
| GB | 2 050 919 | 1/1981 |
| GB | 2 372 977 | 9/2002 |
| JP | 48-31050 | 9/1973 |
| JP | 49-28628 | 7/1974 |
| JP | S53-10239 | 1/1978 |

(56) References Cited

FOREIGN PATENT DOCUMENTS

| | | |
|---|---|---|
| JP | 54-72181 | 6/1979 |
| JP | S54-070185 | 6/1979 |
| JP | S54-146640 | 11/1979 |
| JP | S56-56830 | 5/1981 |
| JP | S56-62911 | 5/1981 |
| JP | 56-72730 | 6/1981 |
| JP | S56-150815 | 11/1981 |
| JP | S57-210829 | 1/1982 |
| JP | 57-37827 | 2/1982 |
| JP | S57-126310 | 8/1982 |
| JP | S57-177730 | 11/1982 |
| JP | S58-55005 | 4/1983 |
| JP | S61-192539 | 8/1986 |
| JP | 63-189224 | 8/1988 |
| JP | 64-004662 | 2/1989 |
| JP | 03-43342 | 2/1991 |
| JP | 03-076625 | 4/1991 |
| JP | H04-10012 | 1/1992 |
| JP | H05-81009 | 4/1993 |
| JP | H05-193694 | 8/1993 |
| JP | 06-270235 | 9/1994 |
| JP | 6-336238 | 12/1994 |
| JP | 07-300121 | 11/1995 |
| JP | H08-048322 | 2/1996 |
| JP | 08-244747 | 9/1996 |
| JP | 08-282633 | 10/1996 |
| JP | H08-253220 | 10/1996 |
| JP | 09-039934 | 2/1997 |
| JP | H09-110045 | 4/1997 |
| JP | 10-167226 | 6/1998 |
| JP | 10-181734 | 7/1998 |
| JP | 10-230919 | 9/1998 |
| JP | 3056271 | 11/1998 |
| JP | 11-218537 | 8/1999 |
| JP | 2000-229615 | 8/2000 |
| JP | 2002-127237 | 5/2002 |
| JP | 2002-216717 | 8/2002 |
| JP | 2002-326618 | 11/2002 |
| JP | 2003-095238 | 4/2003 |
| JP | 2004-026307 | 1/2004 |
| JP | 2006-501109 | 1/2006 |
| JP | 2007-216981 | 8/2007 |
| JP | 2008-189721 | 8/2008 |
| JP | 2009-001639 | 1/2009 |
| NZ | 240448 | 6/1995 |
| NZ | 296014 | 10/1998 |
| NZ | 335565 | 10/1999 |
| NZ | 506684 | 8/2000 |
| NZ | 512423 | 5/2001 |
| NZ | 521694 | 9/2002 |
| WO | WO 93/09031 | 5/1993 |
| WO | WO 93/12975 | 7/1993 |
| WO | WO 94/05555 | 3/1994 |
| WO | WO 94/06617 | 3/1994 |
| WO | WO 97/03885 | 2/1997 |
| WO | WO 97/14617 | 4/1997 |
| WO | WO 97/34808 | 9/1997 |
| WO | WO 99/21770 | 5/1999 |
| WO | WO 00/38902 | 7/2000 |
| WO | WO 00/51895 | 9/2000 |
| WO | WO 01/12531 | 2/2001 |
| WO | WO 01/40081 | 6/2001 |
| WO | WO 01/74689 | 10/2001 |
| WO | WO 02/02418 | 1/2002 |
| WO | WO 02/18213 | 3/2002 |
| WO | WO 02/085755 | 10/2002 |
| WO | WO 2004/028910 | 4/2004 |
| WO | WO 2004/106176 | 9/2004 |
| WO | WO 2004/106175 | 12/2004 |
| WO | WO 2005/012091 | 2/2005 |
| WO | WO 2005/025999 | 3/2005 |
| WO | WO 2005/087628 | 9/2005 |
| WO | WO 2006/113428 | 10/2006 |
| WO | WO 2007/047574 | 4/2007 |
| WO | WO 2007/127337 | 11/2007 |
| WO | WO 2010/058098 | 5/2010 |

OTHER PUBLICATIONS

International Search Report for PCT/US2006/040361, dated Feb. 26, 2007.
Application and development of PET plastic bottle, Publication of Tsinghad Tongfang Optical Disc. Co. Ltd., Issue 4, 2000, p. 41 (No English translation available).
Manas Chanda & Aalil K. Roy, Plastics Technology Handbook, 4th Edition, 2007 CRC Press, Taylor & Francis Group. pp. 2-34 thru 2-37.
International Search Report for PCT/US2005/008374, dated Aug. 2, 2005.
IPRP (including Written Opinion) for PCT/US2005/008374, dated Sep. 13, 2006.
International Search Report for PCT/US2004/016405, dated Feb. 15, 2005.
IPRP (including Written Opinion) for PCT/US2004/016405, dated Nov. 25, 2005.
IPRP (including Written Opinion) for PCT/US2006/040361, dated Apr. 16, 2008.
International Search Report for PCT/US2007/006318, dated Sep. 11, 2007.
IPRP (including Written Opinion) for PCT/US2007/006318, dated Sep. 16, 2008.
International Search Report for PCT/US2006/014055, dated Dec. 7, 2006.
IPRP (including Written Opinion) for PCT/US2006/014055, dated Oct. 16, 2007.
ISR for PCT/US2004/024581, dated Jul. 25, 2005.
IPRP (including Written Opinion) for PCT/US2004/024581, dated Jan. 30, 2006.
International Search Report and Written Opinion for PCT/US2012/050251, dated Nov. 16, 2012.
International Search Report and Written Opinion for PCT/US2009/051023, dated Sep. 8, 2009.

* cited by examiner

REPOSITIONABLE BASE STRUCTURE FOR A CONTAINER

CROSS-REFERENCE TO RELATED APPLICATIONS

This application is a divisional of U.S. patent application Ser. No. 12/964,127, filed Dec. 9, 2010, which is a divisional of Ser. No. 11/249,342, filed Oct. 14, 2005, the entire disclosures of which are hereby incorporated by reference.

BACKGROUND OF THE INVENTION

Field of the Invention

The present invention generally relates to a structure of a container base, and more particularly to a base of a container that is repositionable about a hinge in order to partially reduce vacuum pressure experienced by a container during a hot-fill process.

Related Art

Conventionally, manufacturers use a hot-fill process to add a product to a container at an elevated temperature, about 82° C., which can be near the glass transition temperature of the plastic material in the plastic container, and then cap the container. As the container and its contents cool, the contents tend to contract and this volumetric change creates a partial vacuum within the container. In the absence of some means for accommodating these internal volumetric and barometric changes, containers tend to deform and/or collapse. For example, a round container can undergo ovalization, or tend to distort and become out of round. Containers of other shapes can become similarly distorted. In addition to these changes that adversely affect the appearance of the container, distortion or deformation can cause the container to lean or become unstable when placed upon a flat surface.

To overcome the partial vacuum within the container created by the hot-fill process, manufacturers have resorted to various different methods to preserve the integrity of the container. In one known method, vertically oriented vacuum panels are formed on the sidewalls of the container. The vacuum panels are adapted to flex inward in response to an internal vacuum to reduce the volume within the container, which lowers the internal vacuum pressure. However, to significantly reduce the vacuum pressure caused by the hot-fill process, these types of vacuum panels are required over a significant portion of the container and are considered by some to be visually unappealing.

Another known method to compensate for internal vacuum pressure is by forming patterned structures on the container. A region of the container having patterned structure of multiple shapes, curves, and bends increases rigidity of the plastic at the region. However, adding these types of patterned structure is required over a significant portion of the container in order to preserve the structural integrity of the container caused by the volumetric changes in the hot-fill process. Patterned structures also add to the amount of plastic within the container, which adds to the weight, and ultimately to the cost.

What is needed is an improved container that overcomes shortcomings of conventional solutions.

BRIEF SUMMARY OF THE INVENTION

This invention differs from the prior art in modifications which were not previously known or suggested.

The present invention claims a base of a container, a container, and a method of compensating for vacuum pressure changes within a container.

A base of a container includes a bearing surface, a hinge, a first wall sloping in a first direction from the bearing surface to the hinge, and a second wall sloping in a second direction away from the hinge, wherein the second wall is adapted to be repositioned about the hinge with substantially no movement of the first wall.

A container including an upper portion having an opening into the container, a container body positioned below the upper portion and defining an interior of the container, and a base adjoining the container body at an end of the container opposite from the upper portion. The base includes a hinge, a first wall between the container body and the hinge, the first wall sloping toward the interior of the container, and a second wall adjoining the hinge, the second wall sloping away from the interior of the container and being adapted to be repositioned about the hinge.

A method of compensating for vacuum pressure changes within a container including hot filling the container with a product, sealing the container with a closure, cooling the hot filled container, repositioning a base wall adjoining a hinge of the base about the hinge from an outward extending position to an inward extending position, thereby reducing the internal pressure of the container, wherein prior to repositioning, the container is adapted to stand upright on a flat surface.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Figure 1A:
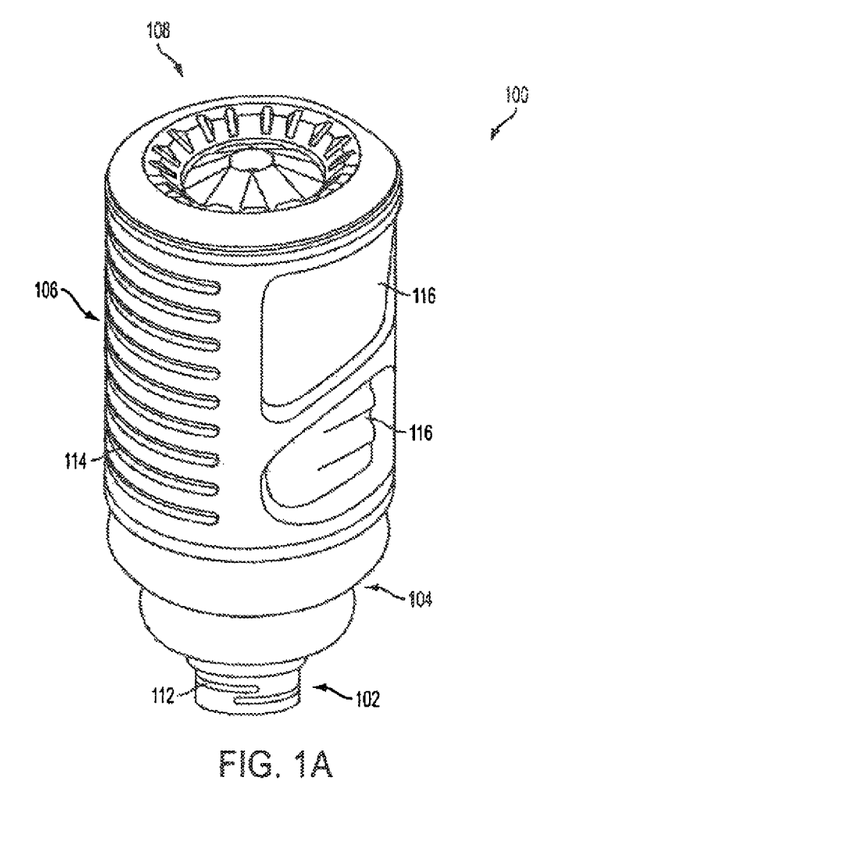
FIGS. 1A-1C depict an exemplary embodiment of a container having a base structure according to the present invention.
Figure 1B:
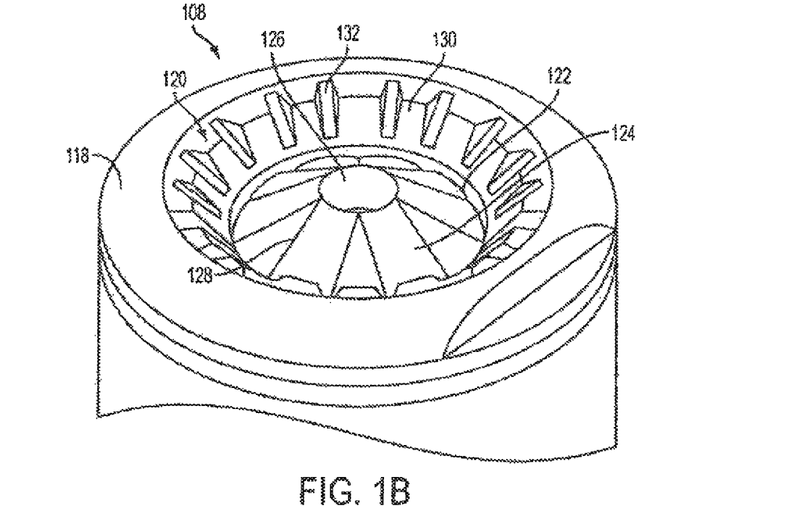
Figure 1C:
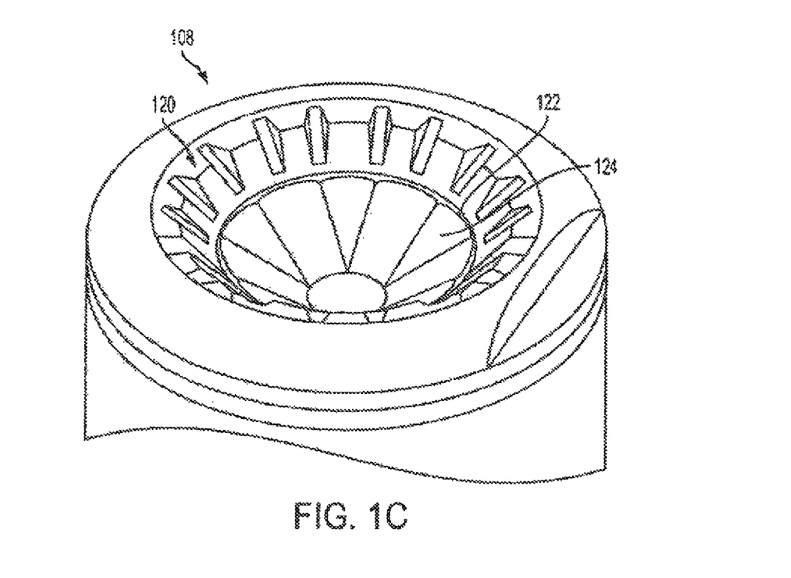

The present invention generally relates to a base structure of a container that can be repositioned about a hinge to partially reduce an internal vacuum pressure within the container caused by cooling of a product after a hot fill process. FIGS. 1A-1C illustrate an exemplary embodiment of a container 100 having a base structure according to the present invention. Initially, the invention will be described referring to FIGS. 1A-1C.

According to an embodiment of the present invention, the container 100 includes an upper portion 102, a shoulder 104, a container body 106, and a base 108. The upper portion 102 of the container 100 generally is any structure having an opening into the interior of the container 100 and is adapted to receive a closure (not shown). The closure is any device used to create a substantially air tight seal for the hot-filled product within the container 100, thus substantially preventing air from entering the container 100 through the upper portion 102, In one embodiment, the upper portion 102 includes threads 112 that are adapted to couple with a closure that is a twist-on cap. The cap may be twisted onto the threads 112 of the upper portion 102 to create a seal with the container 100. In an alternative embodiment, a sealing plug may be placed in the upper portion 102 to seal the container 100. Other closures or seals may be used, as will be appreciated by those of skill in the art.

The shoulder 104 of the container 100 extends from the top of the container body 106 to the bottom of the upper portion 102. Generally, the shoulder 104 narrows as it progresses from the container body 106 to the bottom of the upper portion 102. The shoulder 104 may have any desired shape, or may be omitted from the container 100. The shoulder 104 may include patterns, shapes, and other known geometries, or alternatively, may be substantially smooth. In the depicted embodiment, the width of the bottom of the shoulder 104 corresponds to the width of the top of the container body 106, and narrows by curving inward as the shoulder 104 approaches the upper portion 102. The shoulder 104 curves outward before reaching the upper portion 102, and then curves inward as the shoulder 104 reaches the upper portion 102. The shoulder 104 may be other shapes and include other patterns, as will be appreciated by those of skill in the art.

The container body 106 of the container 100 extends from the base 108 to the shoulder 104 and defines an interior of the container 100. The container body 106 is positioned below the upper portion 102. In an alternative embodiment, if the shoulder 104 is omitted from the container 100, the container body 106 extends to the upper portion 102. The container body 106 may be any known asymmetrical or symmetrical shape, such as, for example, cylindrical, square, rectangular, or other geometries. Optionally, the container body 106 of the container 100 may include patterned support structure or vacuum panels. The patterned support structure and the vacuum panels help provide structural integrity for the container 100, as will be discussed later in detail.

In the depicted embodiment, the container body 106 is cylindrical and has ribs 114 and multiple vacuum panels 116. The ribs 114 may be a series of recessed sections followed by non-recessed sections on the container body 106. The vacuum panels 116 may be substantially flat recessed sections having a much larger recessed area than that of the ribs 114. Alternatively, vacuum panels may be configured to form a grip region. Other vacuum panel designs are known in the art. A container according to the invention may include different types of vacuum panels. The ribs 114 may include other types and shapes and both the ribs 114 and the vacuum panels 116 may be placed at alternate locations on the container body 106, as will be appreciated by those of skill in the art. The ribs 114 and the vacuum panels 116 may also be omitted from the container body 106, and may be placed at other locations on or omitted from the container 100.

As depicted in FIG. 1B, the base 108 includes a bearing surface 118, a first wall 120, a hinge 122, a second wall 124, and a section 126. The bearing surface 118 of the base 108 is the contact surface of the container 100 that may contact a flat surface when the base 108 is placed upright on the flat surface. The container 100 is upright on the flat surface when a substantial portion of the bearing surface 118 contacts the flat surface and the flat surface is underneath the container 100. The bearing surface 118 may be formed in other asymmetrical or symmetrical geometries, as will be appreciated by those of skill in the art.

The first wall 120 of the container 100 is located between the bottom of the container body 106 and the hinge 122. The first wall 120 slopes in a direction from the bearing surface 118 to the hinge 122 towards the interior of the container 100. The slope of the first wall 120 may be curved or linear, or a combination of curved and linear sections. The first wall 120 may include indented ribs 132 to add strength to the base 108, the first wall 120, and the container 100. Typically, when plastic is formed as ribs, as opposed to a flat or smooth surface, the rigidity of the plastic increases in the region around the ribs. Thus, ribs 132 improve the structural integrity of the base 108, and analogously, the ribs 114 strengthen the container body 106 for similar reasons.

In one embodiment, the first wall 120 includes support braces 130 between ribs 132. As depicted, the ribs 132 and the support braces 130 are adjoining. The support braces 130 extend substantially from the bearing surface 118 to the hinge 122. The ribs 132 also extend substantially from the bearing surface 118 to the hinge 122. However, in the depicted embodiment, the ribs 132 follow substantially a straight line between the bearing surface 118 and the hinge 122, whereas the support braces 130 are a two part revolved surface formed on the first wall 120. The support braces 130 are two substantially flat sections that intersect at an angle and extend outward from the straight line between the bearing surface 118 and the hinge 122.

The hinge 122 of the base 108 is located at the intersection of the first wall 120 and the second wall 124. The hinge 122 is the location about which the second wall 124 is repositioned after the container 100 is hot-filled and sealed, as will be discussed later in detail. The hinge 122 is depicted as a circular ring that is offset from the bearing surface 118. However, the hinge 122 may be other symmetrical or asymmetrical shapes, as will be appreciated by those of skill in the art.

Prior to repositioning, the second wall 124 slopes in a direction away from the hinge 122, which is also away from the interior of the container 100. The second wall 124 slopes in the direction of the section 126. The slope of the second wall 124 may be curved or linear, or a combination of curved and linear sections, as will be appreciated by those of skill in the art. In the depicted embodiment, the second wall 124 slopes substantially linearly from the hinge 122 to the section 126. The second wall 124 in the illustrated embodiment also includes creases 128 that facilitate the repositioning of the second wall 124 about the hinge 122. The creases 128 are adapted to flex during repositioning of the second wall 124.

The section 126 is centrally located within the second wall 124, and may be concave, convex, or flat relative to the interior of the container 100. The section 126 is adapted to receive a mechanical device that repositions the second wall 124 about the hinge 122. The mechanical device may apply a force on the section 126 to reposition the second wall 124.

The structure of the base 108 is adapted to partially reduce an internal vacuum pressure experienced by the container 100 during hot-fill processing. After the container 100 is hot-filled with a product and sealed with a closure, such as, for example, a cap, the product begins to cool within the container 100. Cooling of the product creates an internal vacuum pressure within the container 100 due to a reduction in product volume caused by the cooling and contraction of the product. The internal vacuum pressure within the container 100 tends to cause the container 100 to collapse inwardly.

To overcome a portion of the internal vacuum pressure within the container 100, the second wall 124 may be repositioned about the hinge 122. FIG. 1C illustrates an exemplary embodiment of the second wall 124 after repositioning about the hinge 122. During repositioning, the second wall 124 is moved from a position extending outward from the container 100 to a position extending inward into the interior of the container 100.

Inwardly repositioning the second wall 124 reduces the amount of volume within the interior of the container 100. This reduction in volume partially reduces the internal vacuum pressure within the container 100 caused by the volumetric shrinkage of the cooling product. The amount of volume reduced relates to the volume of the region within the base 108 of the container 100 bounded by the second wall 124 and the section 126. The volume reduced relates to the difference of internal volume between the container 100 shown in FIG. 1B with the second wall 124 extending outward, and the container 100 shown in FIG. 1C with the second wall 124 extending inward into the interior of the container 100.

The volume of the space bounded by the second wall 124 and the section 126 may be used to control the amount of volumetric pressure reduction within the container 100. The larger the volume of the space bounded by the second wall 124 and the section 126, the larger the reduction of internal pressure. This may be used to control the amount of ribs 114 on the remainder of the container 100, and also may be used to affect the size of the vacuum panel panels 116 required to meet the needs of customers and hot-filling processors. In particular, by partially accommodating the pressure changes by use of a base according to the invention, the number or size of ribs and/or vacuum panels can be reduced. Persons skilled in the art can thus calculate the amount of the volumetric change achievable by repositioning of the second wall, and adjust the container design accordingly.

Substantially no net movement or change in location of the first wall 120 during or after repositioning of the second wall 124 because of the rigidity of the first wall 120. In one embodiment, the strength of the first wall 120 prevents deformation of the base 108 during inversion. Applying a force to section 126 to invert the second wall 124 creates stress on the plastic material of the container 100. Deformation of the container 100 may cause folding of the bearing surface 118, buckling of the plastic in the base 108, or other deformations in the container 100. To prevent deformations, the structure of the base 108 including the ribs 132 and the support braces 130 provides the first wall 120 with sufficient strength to prevent deformation of the container 100 and the base 108 at, but not limited to, the bearing surface 118. This allows the container 100 and the first wall 120 to withstand the stresses created on the plastic during inversion and allows the container 100 to stably stand upright on a flat surface after inversion.

To compensate for the remainder of the vacuum not compensated for by repositioning the second wall 124, the container 100 also includes the vacuum panels 116 and the ribs 114. In response to internal vacuum pressure, the vacuum panels 116 flex inward to further reduce the volume of the container 100, and the strength of the ribs 114 is able to withstand the remaining vacuum pressure. Thus by using the vacuum panels 116 and the ribs 114 in combination with the repositionable second wall 124, the structural integrity of the container 100 is preserved while reducing the vacuum within the container 100. The repositionable second wall 124 allows for container manufacturers to incorporate fewer vacuum panels and ribs in their containers, while not sacrificing container shape or container integrity due to the internal vacuum pressure stresses caused by the hot-fill process. The repositionable second wall 124 also allows using less plastic material per container, which results in lower per container costs in the container itself, as well as in lower costs in transporting the lighter container.

Figure 2:
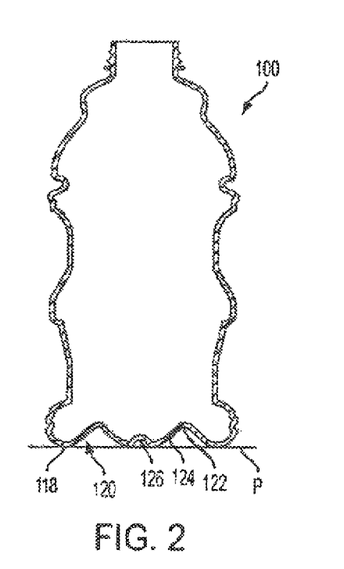
FIG. 2 illustrates a cross sectional view of an exemplary embodiment of a container according to the present invention.

In contrast with prior art solutions, the container 100 is able to stand stably upright on a flat surface prior to repositioning the second wall 124 without requiring a support mechanism for the container 100. FIG. 2 illustrates an exemplary embodiment of a cross sectional view of the container 100 prior to repositioning of the second wall 124 standing on a planar surface P according to the present invention. To allow the container 100 with a repositionable second wall 124 to stably stand upright on a flat surface, the section 126 and the second wall 124 do not extend outward from the container 100 beyond the bearing surface 118, thus allowing the bearing surface 118 of the container 100 to contact the flat surface. In one embodiment, at least a portion of the section 126 contacts the flat surface. The ability to stand stably on a flat surface is advantageous in that the bearing surface 118 is the area of the container 100 designed to bear the load of the container and of the hot-filled product. By not having the section 126 extending beyond the bearing surface 118, the container 100 can be transported in an upright position prior to and during processing without requiring a support mechanism to keep the container 100 from falling over, and results in cost savings by eliminating the support mechanism to hold the container upright. The base 108 of the container 100 provides the benefit of reduced internal vacuum pressure caused by the hot-fill process and allows the container to stably stand on a flat surface for transport between container processing machines.

Figure 3A:
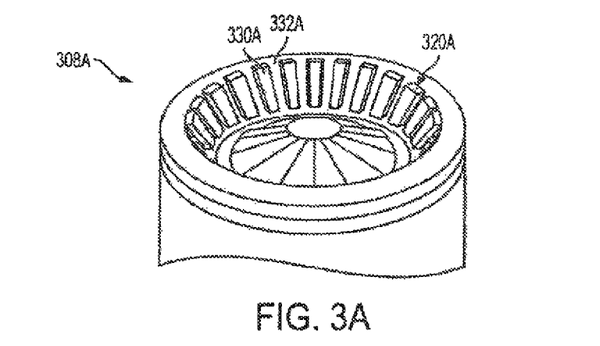
FIGS. 3A-3G illustrate alternative exemplary embodiments for the structure of a base of a container according to the present invention.
Figure 3B:
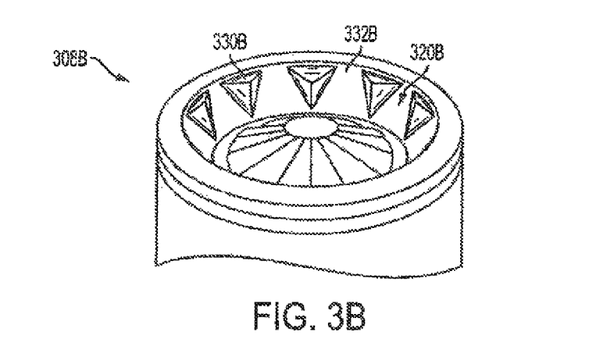
Figure 3C:
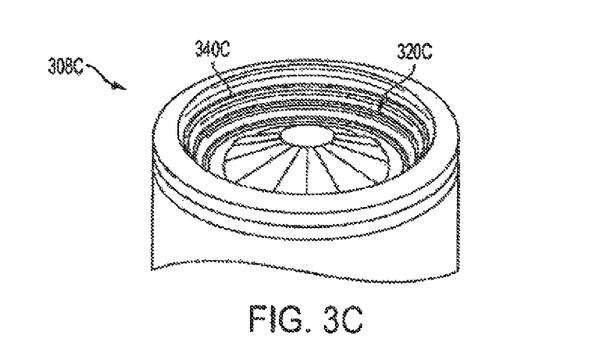
Figure 3D:
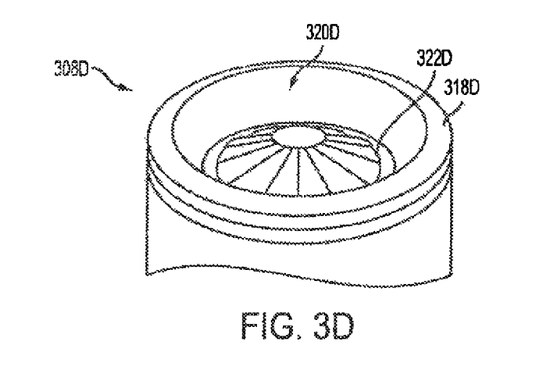
Figure 3E:
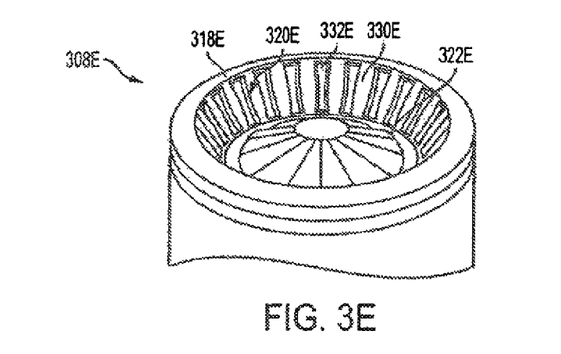
Figure 3F:
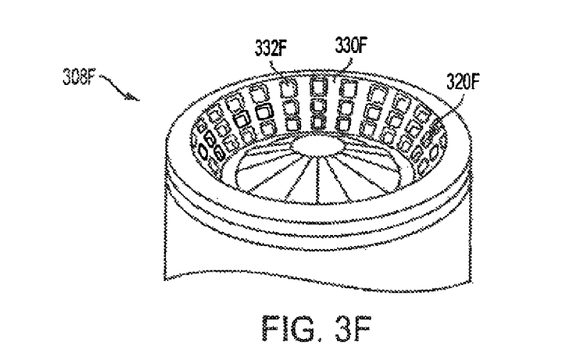
Figure 3G:
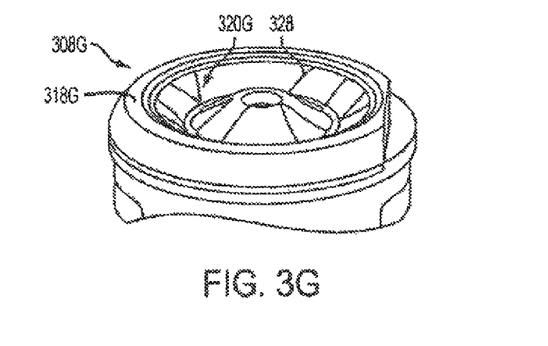

FIGS. 3A-3G illustrate alternative exemplary embodiments for the structure of the base 108 according to the present invention. Each of bases 308A-G includes features similar to those in base 108 of FIGS. 1A-1C. Most notably, FIGS. 3A-3G differ in the structure of the support braces 330A-G and in the ribs 332A-G from the previously described base 108. FIG. 3A illustrates a first wall 320A of base 308A including alternating flat protruding support braces 330A and flat recessed ribs 332A. FIG. 3B illustrates first wall 320B of a base 308B including pyramidally shaped ribs 332B and trapeziodally shaped support braces 330B. FIG. 3C illustrates a first wall 320C of base 308C including multiple circularly shaped concentric ridges 340C. FIG. 3D illustrates a first wall 320D of a base 308D that bows inward toward the interior of the container from a bearing surface 318D to the hinge 322D without any ribs or support braces. FIG. 3E illustrates a first wall 320E of base 308E including ribs 332E and support braces 330E. The support braces 330E narrow at the bearing surface 318E and at the hinge 322E and flare out in the middle therebetween. The ribs 332E flare out at the bearing surface 318E and at the hinge 322E and narrow in the middle therebetween. FIG. 3F illustrates a first wall 320F including flat support braces 330F between ribs 332F each having three square concave indentations into the interior of the container. A base 308G as illustrated in FIG. 3G includes a bearing surface 318 and a first wall 320G having creases 328. The creases 328 in the first wall 320G are similar to the creases 128 of the second wall 124 in the embodiment depicted in FIG. 1B. It is noted that FIGS. 3A-3G are exemplary embodiments of base structures according to the present invention, and that other embodiments having symmetrical, asymmetrical, non-circular, or other shapes may be used as will be appreciated by those skilled in the art.

The container 100 may be formed of plastic materials known in the art. The container 100 may have, for example, a one-piece construction and can be prepared from a monolayer plastic material, such as a polyamide, for example, nylon; a polyolefin such as polyethylene, for example, low density polyethylene (LDPE) or high density polyethylene (HDPE), or polypropylene; a polyester, for example polyethylene terephthalate (PET), polyethylene naphtalate (PEN); or others, which can also include additives to vary the physical or chemical properties of the material. For example, some plastic resins can be modified to improve the oxygen permeability. Alternatively, the container 100 can be prepared from a multilayer plastic material. The layers can be any plastic material, including virgin, recycled and reground material, and can include plastics or other materials with additives to improve physical properties of the container. In addition to the above-mentioned materials, other materials often used in multilayer plastic containers include, for example, ethylvinyl alcohol (EVOH) and tie layers or binders to hold together materials that are subject to delamination when used in adjacent layers. A coating may be applied over the monolayer or multilayer material, for example to introduce oxygen barrier properties.

The container 100 may be formed by any plastic molding process. The container 100 may be formed by a stretch blow molding process where warm gas is used to stretch a plastic preform into a container mold. The preform may have a threaded top, or may use a continuous plastic tube. Blow molding the plastic tube may involve inserting a needle into the plastic tube, and forcing gas through the needle to expand the plastic tube to take the shape of a mold for a container. Additionally, other blow molding techniques may be used for forming the container 100, including injection blow molding, stretch blow molding, or extrusion blow molding, as will be appreciated by those of skill in the art.

Figure 4:
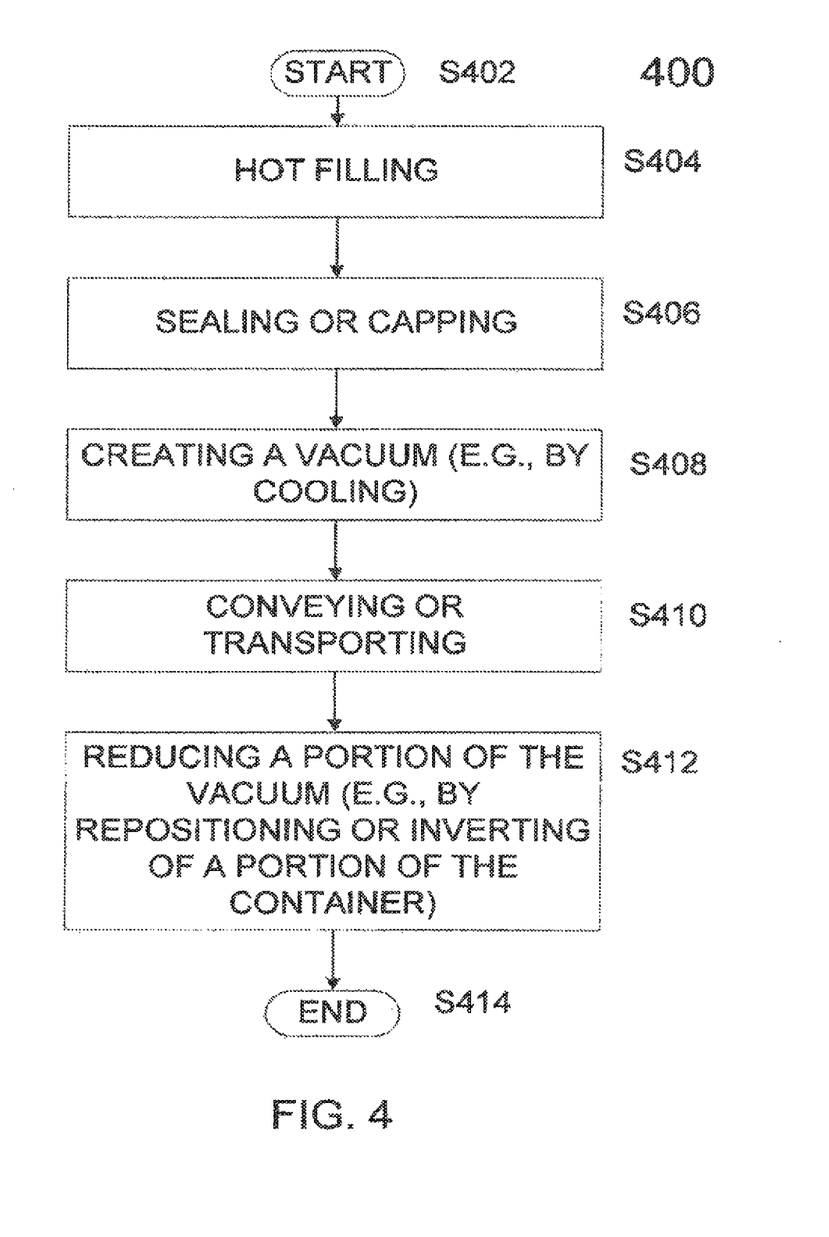
FIG. 4 depicts a flow chart illustrating a representative method implemented according to an illustrative embodiment of the disclosed subject matter.

FIG. 4 depicts a flow chart illustrating a representative method 400 implemented according to an illustrative embodiment of the disclosed subject matter. The method can start at S402 and proceed to S404. At S404 hot filling of the container can take place. The container can be hot filled substantially as described above. The method may proceed to S406. At S406, the container can be capped or sealed substantially as described above, for example, with a cap. The method may proceed to S408. At S408 a vacuum may be created in the container, substantially as described above, such as by cooling. The method may proceed to S410. At S410 the container may be conveyed or transported, substantially as described above. The method may proceed to S412. At S412, a portion of the vacuum may be reduced or otherwise eliminated, substantially as described above. For example, a portion of the container may be repositioned or inverted to reduce a portion of the vacuum. As another example, a portion of the container may move to reduce a portion of the vacuum. The method may end at S414.

The embodiments illustrated and discussed in this specification are intended only to teach those skilled in the art the best way known to the inventors to make and use the invention. Relative terminology and directional words, such as upper, below, interior, etc., are used in the application as a means of describing the present invention, and not of limitation. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A plastic bottle comprising:
   a neck portion;
   a body portion; and
   a base portion forming a bearing surface for the plastic bottle, the base portion comprising:
   a bottom end having a hinge element;
   a first wall portion extending a first direction away from the hinge element;
   a second wall portion extending a second direction away from the hinge element, the second wall portion including a plurality of radial creases; and
   an inner section circumscribed by the second wall portion,
   the second wall portion and the inner section being adapted to move about the hinge element from a first position to a second position with substantially no movement of the first wall portion, the creases adapted to flex during movement of the second wall portion,
   wherein in the first position, no portion of the second wall portion and the inner section extend below the bearing surface.

2. The plastic bottle of claim 1, wherein in the first position, a portion of the inner section extends to a position co-planar to the bearing surface.

3. The plastic bottle of claim 1, wherein the plurality of radial creases are adapted to facilitate movement of the second wall portion.

4. The plastic bottle of claim 1, wherein the body portion includes at least one vacuum panel.

5. The plastic bottle of claim 1, wherein the first wall portion extends from the standing surface to the hinge toward the interior of the container.

6. The plastic bottle of claim 1, wherein the first wall portion includes radial support ribs.

7. A plastic bottle adapted for hot-filling, the bottle comprising:
   a neck portion;
   a body portion; and
   a base portion forming a bearing surface for the plastic bottle, the base portion comprising:
   a bottom end having a hinge element;
   a first wall portion extending a first direction away from the hinge element and from the standing surface to the hinge toward the interior of the container, the first wall portion including radial support ribs;
   a second wall portion extending a second direction away from the hinge element; and an inner section circumscribed by the second wall portion, the second wall portion and the inner section adapted to move about the hinge element from a first position to a second position with substantially no movement of the first wall portion during the movement of the second wall portion, wherein in the first position, no portion of the second wall portion and the inner section extends below the bearing surface.

8. The plastic bottle of claim 7, wherein in the first position, a portion of the inner section extends co-planar with the bearing surface.

9. The plastic bottle of claim 7, wherein the second wall portion includes a plurality of radial creases adapted to flex during movement of the second wall portion.

10. The plastic bottle of claim 9, wherein the plurality of radial creases are adapted to facilitate movement of the second wall portion.

11. The plastic bottle of claim 7, wherein the body portion includes at least one vacuum panel.

12. A plastic bottle comprising:
a neck portion;
a body portion; and
a base portion forming a bearing surface for the plastic bottle and having:
a bottom end having a hinge element;
a first wall portion extending a first direction away from the hinge element;
a second wall portion extending a second direction away from the hinge element; and
an inner section circumscribed by the second wall portion,
the second wall portion and the inner section being adapted to move about the hinge element from a first position to a second position with substantially no movement of the first wall portion,
wherein in the first position, no portion of the second wall portion and the inner section extends below the bearing surface, and a portion of the inner section is co-planar with the bearing surface.

13. The plastic bottle of claim 12, wherein the second wall portion includes a plurality of radial creases adapted to flex during movement of the second wall portion.

14. The plastic bottle of claim 13, wherein the plurality of radial creases are adapted to facilitate movement of the second wall portion.

15. The plastic bottle of claim 12, wherein the body portion includes at least one vacuum panel.

16. The plastic bottle of claim 12, wherein the first wall portion extends from the standing surface to the hinge toward the interior of the container.

17. The plastic bottle of claim 12, wherein the first wall portion includes radial support ribs.

18. A plastic bottle adapted for hot-filling, the bottle comprising:
a neck portion;
a body portion including at least one vacuum panel; and
a base portion forming a bearing surface for the plastic bottle and having:
a bottom end having a hinge element;
a first wall portion extending a first direction away from the hinge element and sloping from the bearing surface to the hinge, the first wall portion including a plurality of radial support ribs;
a second wall portion extending a second direction away from the hinge element, the second wall portion including a plurality of radial creases; and
an inner section circumscribed by the second wall portion,
the second wall portion and the inner section being adapted to move about the hinge element from a first position to a second position with substantially no movement of the first wall portion, the creases adapted to flex to facilitate movement of the second wall portion,
wherein in the first position, no portion of the second wall portion and the inner section extends below the bearing surface, and a portion of the inner section is co-planar with the bearing surface.

* * * * *